S. C. Ellis,
Tenoning Blind Slats.
N° 16,534. Patented Feb. 3, 1857.
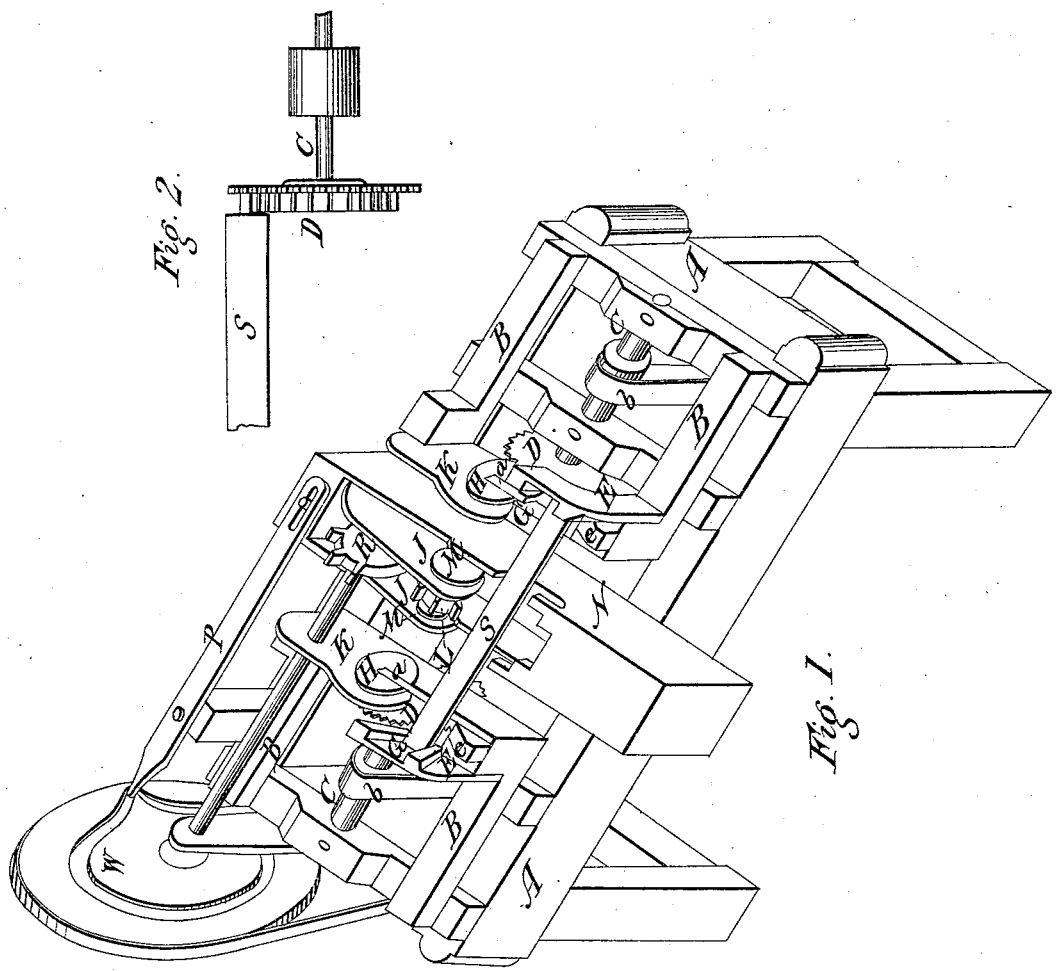
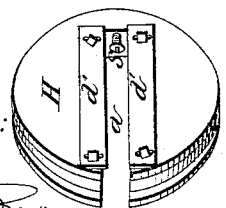
Witnesses:
Inventor:
Seth C Ellis

UNITED STATES PATENT OFFICE.

SETH C. ELLIS, OF ALBANY, NEW YORK.

MACHINE FOR CUTTING TENONS ON BLIND-SLATS.

Specification of Letters Patent No. 16,534, dated February 3, 1857.

*To all whom it may concern:*

Be it known that I, SETH C. ELLIS, of the city of Albany, State of New York, have invented a Machine for Cutting the Tenons or Axles at Each End of Window-Blind Slats; and I declare the following specification, with the drawings hereto appended as part of the same, to be a full and perfect description thereof.

Figure 1 represents in perspective a view of the machine. Fig. 2 a plan of part of the sawing apparatus as applied to the slat. Fig. 3 represents one of the disks with its adjustable apparatus.

A, A is a strong frame upon the top of which at each end is a cross frame B, B, each frame carrying a saw shaft C, C, with circular saws D, D, attached to the same, the saws being on the inner ends of the shaft, and arranged as hereinafter described. On the front cross beams of the frames B, B, and just outside of the range of the saws, are two feeding guides E, E, being upright frames having vertical hopper shaved grooves G, G, cut in their inner sides which face each other of a size to receive the blind slats S lying lengthwise between them, and conduct them down to the proper range for the operation of the saws, the slats having been cut square of more than their full length, and of their proper width. The lowest slat rests upon the inner edges of the frames B B, which edges beyond the slat are continued upon support vertical plates of metal K K of a few inches in height, which serve for the support over the range of the axes of the saws of two disks H, H, which lie within annular orifices in K and can revolve within their orifices. These disks are large enough to have each within it directly through its diameter a slot $a, a,$ to hold at its center the slat S which can be passed from the hopper G along the edge of B into $a, a,$ which ranges with its level. This position of the slat brings it into contact with the saws at each of its extremities. The slat is then turned around by hand or otherwise which the revolving arrangement of H H allows to be done, by which revolution the saws whose distance is properly gaged for that purpose, cut entirely around the central portion of the wood leaving a perfectly cylindrical tenon at each end of the slat.

In order to gage the saws properly the frames B, B, are movable upon the frame A and adjustable thereon by any usual mechanical device. The saws are moved by belts $b, b,$ in the usual way, and they are driven so as to cut toward or in the direction of the center of the tenon, as they cut into the wood making a clean cut, which cannot be done when the saw cuts outwardly, since then its tendency is to splinter off the material.

In order to accommodate the machine to slats of different sizes the frames B, B, are adjustable nearer to or farther from each other. To gage the size of the slot, $a, a,$ to fit larger or smaller slats and keep them in the center of the disk, two adjustable plates $d'-d^2$ on the side of a disk, Fig. 3 regulate it to the thickness of the slat, and a set screw S in the back of the slot to the width of the slat. The saws are fitted side by side on same axle, as shown in Fig. 2, one large one to cut off the blind to its length, and several others of equal diameter together equal in thickness to the length of the blind axle.

In combination with the above machine I connect an automatic feeding apparatus for supplying the slats to the saws to wit: Two cheeks J, J, a small distance apart are framed into A, A, parallel with the side pieces K, K, and midway between them. Directly in range with the disks H, H, are two similar disks M, M, connected together with a toothed wheel L between them, the disks and wheel having through them a slot corresponding with $a, a,$ in range and dimensions, so that a slat can lie across through all the slots. A box or frame N extending across the machine embraces the cheeks J, J, and is arranged to slide a short distance backward and forward on the machine. This sliding movement is communicated to the frame by lever P, which is itself liberated back and forth by a wheel W containing a face-cam into which one end of the lever takes, the other end being pivoted upon the back end of frame N. The object of the disks M, M, with their toothed wheel L is by their revolution to turn the slat around, instead of doing it by hand. The wheel L is at the proper period of the movement of the machine turned by the partially toothed wheel R attached to the shaft of wheel W.

The operation of the machine is, as follows: If used without the self feeding apparatus, the slats which have been properly planed to thickness and width are laid down one by one on the edge of the frames B, B, and moved along them into the slots $a$, $a$, of the disks H, H. As they pass into the slots they meet the teeth of the saws, which cut one side of the tenon; when they reach the extreme end of the slots, they are turned around by the operator making a complete revolution over the saws, which by that means cuts entirely around the central part of the slat; the smaller saws forming a cylindrical tenon: the large saws cutting the entire slat of its proper length.

If used with the feeding apparatus the operation is thus: The guide or stopper G, G, being fitted with slats filed one over the other, the lowest one in the pile (which alone is shown in the drawing) lies upon the edges of the frames B, B, extending over box N and lying in a recess therein, so that its top surface shall range with the top of the box, or a trifle below it; also in range with the slot $a$, $a$, and the corresponding one in disk M. The box N moved at the proper time by the lever P and eccentric cam in wheel W carries the slat to its position within the slots in the disks, they remaining immovable for that purpose. By the time the slats are in position the teeth of R couple into L and give the disks a complete revolution, completing the work on the slat. While the disks are revolving the box N remains stationary, but as soon as the revolution is made, the box advances carrying with it the slat, which passing back under the pile of slats, (which are kept up by the upper surface of N) moves back until it reaches two short inclined planes $e$, $e$, up which it rises until deposited on top, whence it is removed by hand. As the box N returns back another slat drops into position is carried into the disks, repeating the movements of the first slat.

What I claim and desire to secure by Letters Patent is—

1. The arrangement of the rotating disks H, H, with their slots $a$, $a$, disposed in reference to and in combination with the saws, for the purpose of regulating the revolution of the slat so as to direct the saws in cutting perfectly cylindrical tenons to it; substantially as set forth in the within specification.

2. I further claim the feeding apparatus, to wit: the sliding box N, disks M, with the wheels L and R lying within the jaws J, J, and the lever P with the eccentric on W, acting together and in combination with the disks H, H, and saws, substantially as set forth in the within specification.

SETH C. ELLIS.

Witnesses:
 RICH. VARICK DE WITT,
 E. J. MILLER.